United States Patent [19]

Goodrich

[11] 4,261,653
[45] Apr. 14, 1981

[54] LIGHT VALVE INCLUDING DIPOLAR PARTICLE CONSTRUCTION AND METHOD OF MANUFACTURE

[75] Inventor: George W. Goodrich, Bloomfield Hills, Mich.

[73] Assignee: The Bendix Corporation, Southfield, Mich.

[21] Appl. No.: 909,882

[22] Filed: May 26, 1978

[51] Int. Cl.³ .............................................. G02F 1/01
[52] U.S. Cl. .................................................. 350/362
[58] Field of Search ................................ 350/362, 151

[56] References Cited

U.S. PATENT DOCUMENTS

| 1,955,923 | 4/1934 | Land | 350/151 |
| 3,527,525 | 9/1970 | Marks | 350/362 |
| 3,841,732 | 10/1974 | Marks | 350/362 |

OTHER PUBLICATIONS

Sheridon, "The Gyncon-A Twist Ball Display," Paper 9-6, The 1977 Conference of the Society of Information Display.

*Primary Examiner*—William L. Sikes
*Assistant Examiner*—León Scott, Jr.
*Attorney, Agent, or Firm*—James R. Ignatowski; Russel C. Wells

[57] ABSTRACT

A light valve is formed of a plurality of spherical dipolar particles suspended in a matrix material. Each spherical dipolar particle has a unified body formed in three discrete symmetrical sections. A central section is configured to permit light transmission when in a first orientation with respect to a path of light travel, and generally not permit light transmission when in a second, transverse orientation with respect to the path of light travel. A pair of intermediate sections bound the central section and are formed of a transparent material having an electrical permittivity that varies through a range of values as a function of the frequency of an applied electric field. A pair of outer sections bounds the intermediate sections and are formed of a material having a relatively stable electrical permittivity within the range of values of the intermediate sections. An applied electric field at one frequency extreme will cause the spherical dipolar particle to align in the first orientation to permit light transmission, and an applied electric field in the other frequency extreme will cause the particle to anti-align in the second, transverse orientation to shutter or reflect light. The matrix material is preferably formed of a plasticized elastomer that has a plurality of expanded cavities, with each cavity containing an outer lubricating layer to allow free rotational motion of a dipolar particle in the cavity. The use of a light valve of the present invention and method of manufacturing the spherical dipolar particle construction are also disclosed.

29 Claims, 11 Drawing Figures

LIGHT VALVE INCLUDING DIPOLAR PARTICLE CONSTRUCTION AND METHOD OF MANUFACTURE

TECHNICAL FIELD

This invention relates to light valves, and more particularly to a dipolar particle useful in a light valve and its method of manufacture.

BACKGROUND OF THE INVENTION

A colloidal light valve is a device whose light transmission characteristic is a function of the condition or state of an independent control variable. The light valve typically comprises a matrix of a host material containing a suspension of dispersed dipolar particles. Each dipolar particle will tend to permit the transmission of light through the valve when it has a first orientation with respect to a path of light travel, and tend to block the transmission of light through the valve when it has a second orientation with respect to the path of light travel. The orientation of each dipolar particle is a function of the state or condition of the control variable. The control variable is commonly either an electrical or magnetic field applied through the light valve.

The following references disclose various forms of light valves utilizing a suspension of dipolar particles: Land, U.S. Pat. No. 1,955,923; Marks, U.S. Pat. No. 3,527,525; Marks, U.S. Pat. No. 3,709,828; Marks, U.S. Pat. No. 3,773,685; Marks, U.S. Pat. No. 3,813,265; Yazaki et al, U.S. Pat. No. 3,823,998; Marks, U.S. Pat. No. 3,841,732; Marks, U.S. Pat. No. 3,848,964; and Marks, U.S. Pat. No. 3,900,417.

In many of the above cited references, the light valve takes the form of a dispersion of elongated electric dipoles in a liquid medium having a relatively high electrical resistance. The liquid is confined in a thin layer between a pair of planar, parallel, transparent, conductive electrodes. When a voltage is impressed between the electrodes, the elongated dipoles align and permit the transmission of light through the light valve. When the voltage is removed, the dipoles, through Brownian motion, orient randomly and the light valve becomes virtually opaque. One limitation of light valves of this type follows from the tendency of the dipoles to settle from their dispersed condition, especially at temperature extremes. Another limitation of a light valve of this type is that it is not amenable for use in display using matrix address techniques.

An improved form of light valve contemplates the use of spherical dipolar particles suspended in a matrix. The matrix material is plasticized to allow the cavities in which the spheres are located to expand. The differential increase in volume due to plasticizing becomes filled with the plasticizing agent. In this manner, the spheres are free to rotate within their volumes, yet are caged therein to prevent settling or agglomeration. This general type of light valve is disclosed in Sheridon, "The Gyricon-A Twist Ball Display", paper 9.6 at the 1977 Conference of the Society of Information Display.

The light valve disclosed by Sheridon uses a white/black sphere as the dipolar element or particle. In particular, one hemispherical surface is white, and the other hemispherical surface is black. The alignment of the spheres is controlled by an electric field that acts upon the different electrophoretic potentials associated with each of the different colored halves of the sphere. This type of light valve changes reflectivity with alignment of the spheres, but not degree of transparency as is generally the case with the more commonly known types of elongated dipole particle dispersion.

DISCLOSURE OF THE INVENTION

The present invention is based upon an improved construction of a spherical dipolar particle suited for use in a light valve comprising a matrix containing a suspension of such dipolar particles. A light valve incorporating the present invention can be operated in both a transmittive mode and a reflective mode, and is especially well-adapted for use in a matrix-addressable display.

A dipolar particle or element in accordance with the present invention is a unified spherical body formed in three distinct sections. In preferred form, a central or innermost section is configured to permit the transmission of light when in a first orientation or alignment with respect to a path of light travel, and to absorb or reflect light when in a second orientation or alignment with respect to the path of light travel. An intermediate section, which bounds the central section, is formed of a material that has an electrical permittivity that varies through a range of values as a function of the frequency of an electrical field applied through the spherical body, i.e. its dielectric constant is frequency dependent. An outer section, which bounds the intermediate section, is formed of a material having a relatively stable value of electrical permittivity that falls within the range of values of the intermediate section. In alternative embodiments, the central section can be a thread of light absorbing material or can have a disc shape with light absorptive or reflective major surfaces.

The spherical body will align or anti-align with an electric field applied through it depending upon the frequency of the electric field. More specifically, the frequency of the electric field will determine the electrical permittivity of the intermediate layer of the spherical body. If the frequency of the electric field is such that the electrical permittivity of the intermediate section is greater than the electrical permittivity of the outer section and surrounding medium, then the differential induced charge in the intermediate section will be of such polarity as to orient the intermediate sections of the sphere in alignment with the applied electric field. Conversely, if the frequency of the electric field is such that the electrical permittivity of the outer section and surrounding medium is greater than the electrical permittivity of the intermediate section, the differential induced charge in the intermediate section will be of such polarity as to orient the intermediate section into an anti-aligned position transverse to the applied electric field. The alignment and antialignment of the spherical body will generally permit and not permit, respectively, the transmission of light through the body. The transmittance of a light valve containing dipolar particles constructed in accordance with the present invention will, therefore, be a function of the frequency of the electric field across the light valve.

In an alternative form of the spherical dipolar particle of the present invention, the central section can be formed of the material having a frequency-dependent range of electrical permittivity and the intermediate sections can be formed of the light absorptive material or can be made to be light reflective.

The dipolar particles of the present invention are preferably dispersed in a matrix of elastomer that has been plasticized to increase the volume of the cavity in which the dipolar particle is contained. The differential increased volume of the cavity is filled with a plasticizing agent which acts as a lubricant to allow the dipolar particle free rotational movement. However, the dipolar particle cannot settle or agglomerate as it is effectively trapped in the cavity.

An advantageous use for a light valve incorporating the present invention is a matrix-addressable display. More specifically, in this application the matrix material is contained between a pair of elongate, planar, transparent electrodes. A first plurality of such electrodes are oriented in parallel spaced relation along a first axis. A second plurality of such electrodes are oriented in parallel spaced relation along a second, transverse axis in substantial congruence with the first plurality to define a matrix of rows and columns. Each distinct position in the matrix can then be accessed for display by electrically energizing the row and column electrodes associated with the matrix position with complementary electrical signals of a frequency appropriate to cause the dipolar particles within the light valve at the accessed position to assume the designed alignment. All other light valve electrodes in the matrix display are energized with non-complementary electrical signals to cause dipolar particles within non-accessed positions of the light valve to remain unaffected. In effect, the selected matrix site can be made to transmit, reflect or absorb light by energizing its corresponding electrodes with electrical signals of appropriate frequency.

Dipolar particles may be constructed in accordance with the present invention through a multi-step process that involves a large scale lay-up of components in assembled relation, a drawing of the assembled components to a narrowed dimension, a slicing of the drawn assembly into elementary beads or segments, and a spherizing of the segments into spherical bodies.

Other advantages of the present invention will be readily appreciated as the same becomes better understood by reference or the following detailed description when considered in connection with the accompanying drawings.

BEST MODE FOR CARRYING OUT THE INVENTION

Figure 1:
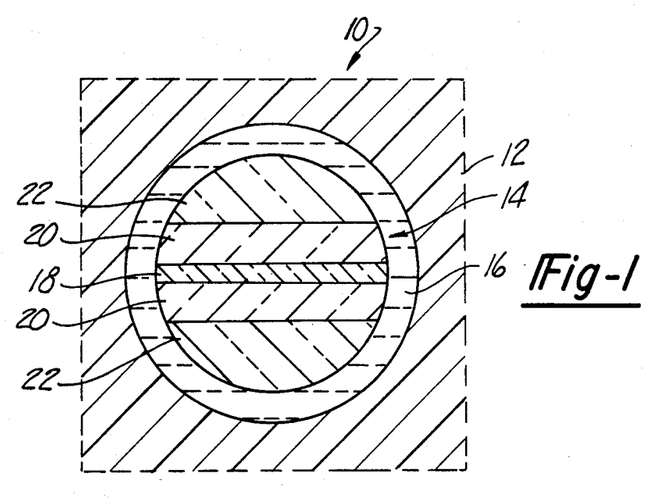
FIG. 1 is an enlarged, cross-sectional view of an elementary portion of a light valve illustrating a spherical dipolar particle constructed in accordance with the present invention contained in an elastomer matrix that has been plasticized.

FIG. 1 is a cross-sectional view through an elementary portion 10 of a light valve formed of a matrix material 12 that hosts in suspension a spherical particle 14 constructed in accordance with the present invention. In the present embodiment, the matrix material 12 is an elastomer, e.g. silicon rubber, that has been plasticized with a plasticizing agent. Alternatively, a sintered plastic that is highly absorptive of a plasticizing agent could likewise serve as the matrix material 12.

The plasticizing of the matrix material 12 causes it to expand and form a differential volume surrounding the spherical dipolar particle 14 that is filled with the plasticizing agent 16. The agent 16 provides a lubricating boundary between the spherical dipolar particle 14 and the surrounding interior wall of its cavity in the matrix material 12. This lubricating boundary allows the spherical dipolar particle to undergo free rotational movement within its cavity. Yet the particle 14 is at all times encaptured in its cavity and cannot settle or agglomerate with other particles.

The construction of the spherical dipolar particle is of basic importance to the present invention. The particle 14 takes the form of a unified spherical body having three distinct symmetrical sections. Each of the three distinct sections is presently described in detail.

A central section 18 is constructed to permit the transmission of light through the spherical body 14 when in a first orientation with respect to a path of light travel and generally not permit the transmission of light through the spherical body when in a second, transverse orientation with respect to the path of light. The central section 18 can take one of two alternative, preferred embodiments. In the first embodiment, the central section is configured as a high aspect ratio thread of light absorbing material, e.g. extramural absorption glass of the type employed in fiber optics. Alternatively, it can be formed of dichroic light polarizing material. In the second preferred embodiment, the central section 18 takes the form of an opaque disc that is either reflective or light absorptive on its major surfaces, e.g. a low refractive index glass would serve as the disc material for a light absorptive central section, and by silvering the major surfaces of the disc it could be made reflective.

A pair of symmetrical transparent intermediate sections 20 bound the central section 18. Each intermediate section 20 is formed of a material having an electrical permittivity which varies through a range of values as a function of the frequency of an electric field applied through the spherical body 14. In a practical embodiment, the intermediate sections 20 may be formed of sodium silicate having a composition ratio of $.24Na_2O \cdot .76SiO_2$ (glass #24). The electrical permittivity characteristic of this type of glass is described in H.E. Taylor, "An Investigation of the Dielectric Relaxation Exhibited by Glass," J. Soc. Glass Tech., pp. 350–482, December 1957. At room temperature, the dielectric constant of glass #24 is 11 at 100 hz, and 8.3 at 10 Khz. The electrical permittivity of the intermediate sections 20, therefore, is a function of the frequency of the electric field applied therethrough.

A pair of symmetrical, transparent outer sections 22 bound the intermediate sections 20. The outer sections 22 are formed of material having a relatively stable value of electrical permittivity that is within the range of values of the intermediate sections 20. In a practical embodiment, Corning 8870 glass, which has a dielectric constant of approximately 9.5, can be used to form the outer sections 22.

It can be seen from inspection of FIG. 1 that the central section 18, intermediate sections 20, and outer sections 22 are symmetrical about a plane containing the central axis of the spherical body 14.

Figure 2:
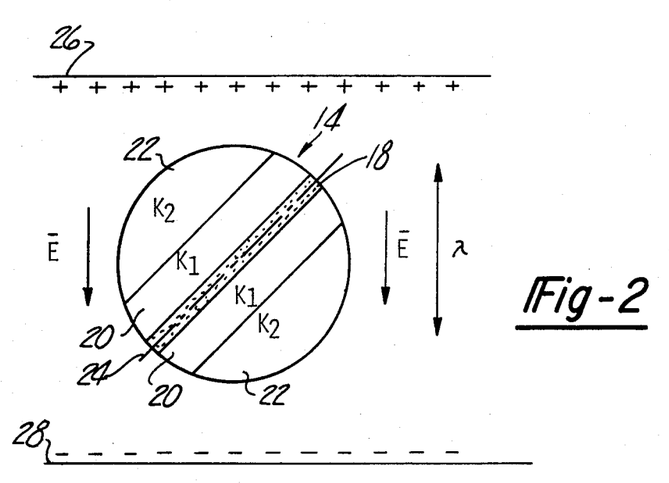
FIG. 2 is a free-body diagram of the spherical dipolar particle of FIG. 1 which shows the influence of an electric field on the particle.

FIG. 2 is a free body diagram of the spherical dipolar particle 14 of FIG. 1, and is useful as an analytical aid in understanding the physical principles of operation of the present invention. For ease of explanation, the plasticizing agent forming the lubricating boundary of the dipolar particle is assumed to have a dielectric constant matched to that of the outer sections 22 to minimize boundary effects. If, for example, Corning 8870 glass is used with a dielectric constant of 9.5, then possible plasticizing agents include Dichloromethane ($Ch_2Cl_2$), 9.08; cis-1,2-Dichlorethylene ($C_2H_2Cl_2$), 9.20; o-Dichlorobenzene ($C_6H_4Cl_2$), 9.93; and 1-Octanol ($C_8H_{18}O$), 10.3—all of which are organic liquids.

The spherical dipolar particle 14 is shown positioned between a pair of opposed, planar electrodes 26 and 28. The electrode 26 has a uniform positive charge distributed on its lower surface, and the electrode 28 has an equal, negative charge on its upper surface by virtue of application of a voltage differential between the electrodes 26 and 28 by means of an external battery or other source. This opposed charge distribution creates a parallel electric field $\bar{E}$ in the direction of the unidirectional arrows, ignoring any slight fringing that may occur at the boundaries of the terminals 26 and 28. A path of light energy is indicated by the bidirectional arrow and symbol $\lambda$. The relative orientation of the spherical dipolar particle 14 is taken with respect to a center axis line 24 through the central section 18.

The behavior of the spherical dipolar particle 14 under the influence of the electrical field $\bar{E}$ is first described in the situation where the dielectric constant K1 of the intermediate sections 20 is greater than the dielectric constant k2 of the outer sections 22. The relative magnitude of the dielectric constants k1 and k2 will determine which of the respective sections 20 and 22 will control the orientation of the spherical dipolar particle 14. Specifically, with k1 greater than k2, the polarity of the induced charge is such that the particle will tend to align the central axis line 24 with a path of light travel indicated by the bidirectional arrow and symbol $\lambda$. In the aligned orientation, the central section 18 presents minimal interference to the transmission of light through the dipolar particle 14.

In the second case to be described, the electrical permittivity k2 of the outer sections 22 is greater than the electrical permittivity k1 of the intermediate sections 20. In this instance, the differential induced charge in the intermediate sections 20 will be of opposite polarity to the above-described case and cause the central axis line 24 to anti-align with the path of light travel as indicated by the bidirectional arrow and symbol $\lambda$. This second, transverse orientation or anti-alignment tends to maximize interference to the transmission of light through the dipolar particle 14.

Figure 3:
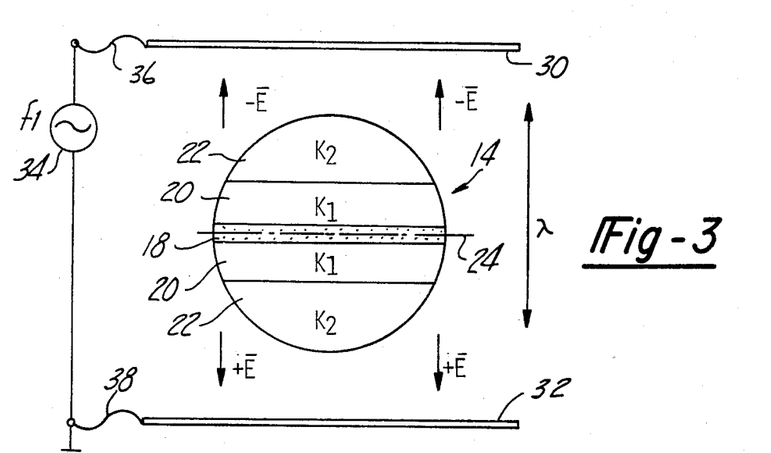
FIG. 3 is a free-body diagram of the spherical dipolar particle of FIG. 1 which shows it in a first orientation when under the influence of an alternating electric field of a first frequency.

Referring now to FIG. 3, the spherical dipolar particle 14 is shown in its actual anti-aligned orientation under the influence of a high frequency alternating electric field. The environment of the dipolar particle 14 is otherwise similar to that of FIG. 2. The electric field is created by applying an alternating voltage at a relatively high frequency f1 across a pair of planar terminals 30 and 32 positioned in opposed relation above and below the spherical dipolar particle 14. The voltage of frequency f1 is supplied by an AC voltage source 34 to terminal 30 by an interconnected lead 36, and to terminal 32 by an interconnected lead 38. The electric field between the planar terminals 30 and 32 will be parallel to the path of light travel, as indicated by the bidirectional arrow. When the output voltage from source 34 is in its positive phase, the electric field will be represented by the $+\bar{E}$ unidirectional arrows, and when the voltage is in its negative phase the electric field will be represented by the $-\bar{E}$ unidirectional arrows.

With the application of a high frequency electric field, the dielectric constant k1 of the intermediate section 20 becomes less than the relatively stable dielectric constant k2 of the outer section 22. Accordingly, the polarity of the differential induced charge in the intermediate sections 20 will control the orientation of the spherical dipolar body. In this case, the charge polarity causes the central axis line 24 to orient transversely to the direction of light travel. In this orientation, the spherical dipolar body allows the least amount of light transmittance through it.

Figures 4, 5:
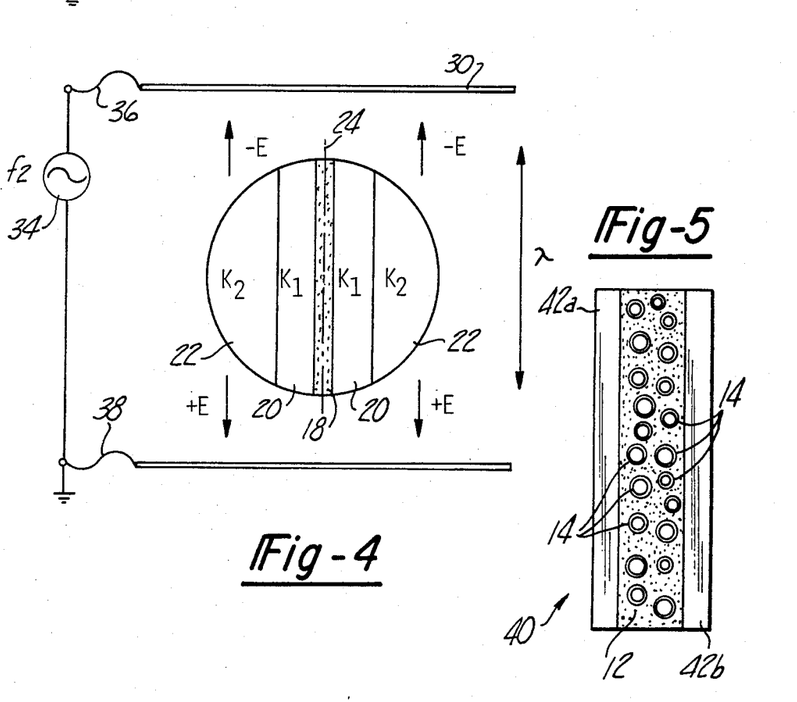
FIG. 4 is a free-body diagram of the spherical dipolar particle of FIG. 1 which shows it in a second, transverse orientation when under the influence of an alternating electric field of a second frequency.
FIG. 5 is an end elevational veiw of a light valve formed of a pair of transparent, planar, spaced parallel electrodes containing a layer of plasticized elastomer having a suspension of spherical dipolar particles therein.

Referring now to FIG. 4, the spherical dipolar body 14 is shown in its actual aligned orientation under the influence of a low frequency alternating field. The environment about the spherical dipolar particle 14 is the same in FIG. 4 as FIG. 3, with one exception. Specifically, the AC voltage source 34 now provides an alternating voltage signal at a low frequency f2. The low frequency voltage signal will cause the electric field between planar terminals 30 and 32 to likewise be at the low frequency f2. In this case, the dielectric constant k1 of the intermediate sections 20 will be greater than the dielectric constant k2 of the outer sections 22. The greater dielectric constant k1 will cause the differential induced charge in the intermediate sections 20 to be of opposite polarity from the preceding case. Specifically, the charge polarity is now such that the central axis line 24 will be parallel to or aligned with the direction of light travel. In this orientation, the central section 18 tends to permit a maximum amount of light transmittance through the particle 14.

FIG. 5 is a schematic representation of a form of light valve 40 made in accordance with the present invention. In particular, the light valve 40 includes a pair of elongated, planar, transparent electrodes 42a and b. The interior wall of each electrode 42a and b has a thin layer (approximately 1000 angstroms) of tin oxide deposited on it to provide electrical conductivity. A matrix material 12 that hosts a suspension of dipolar particles 14 is interposed between the electrodes 42a and b. Each dipolar particle 14 is suspended in the matrix material 12 in the manner illustrated in FIG. 1. The use of the plasticized matrix material 12 causes each spherical dipolar particle 14 to be suspended in a matrix cavity with free rotational motion therein. The alignment or anti-alignment of the spherical dipolar particle 14 will determine the transmittance of the light valve 40 to light incident at a direction normal to the surface of the electrodes 42a and b.

Figure 6:
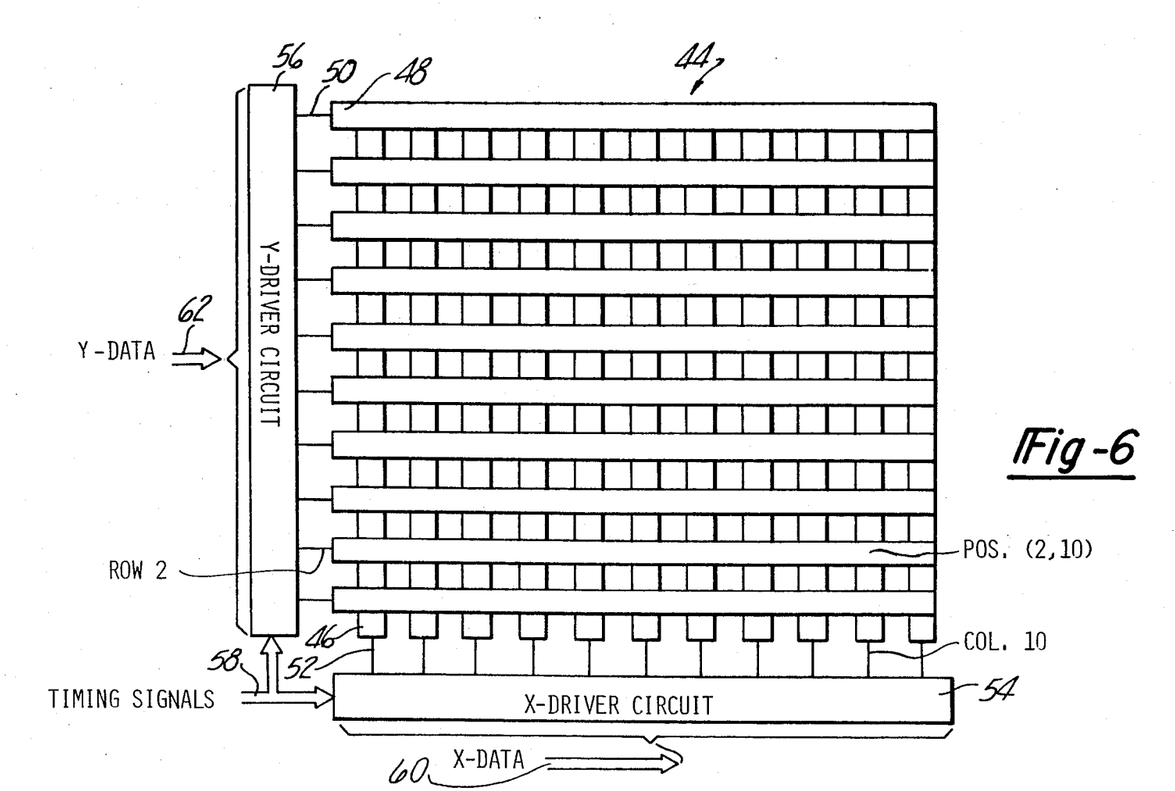
FIG. 6 is a schematic representation of a matrix addressable display formed of orthogonally disposed sets of light valve strips of the type shown in FIG. 5.

FIG. 6 is a schematic illustration of a matrix addressable display 44 made from a plurality of elongated strips of light valves of the type illustrated in FIG. 5. For purposes of the discussion of the display 44 of FIG. 6, the term matrix is used in its mathematical sense, not in its materials science sense as it was used in the description of FIGS. 1 and 5.

The matrix addressable display is formed of a first plurality of light valve strips, as exemplified by strip 46, that are laid in parallel relation to one another along an X-axis. A second plurality of light valve strips, as exemplified by strip 48 are laid in parallel relation to one another along a Y-axis in congruence with the first plurality of light valve strips to define a matrix of rows and columns. The columns are defined by the first plurality of light valves trips, including strip 46 that are distributed along the X-axis, and the rows are defined by the second plurality of light valve strips, including strip 48, that are distributed along the Y-axis.

An X-axis driver circuit 54 is in communication with each of the matrix columns through a terminal lead connection with each individual column, as exemplified by lead 52. A Y-axis driver circuit 56 is in communication with each of the rows through a lead connection with each individual row, as exemplified by lead 50. The X-axis driver circuit 54 and the Y-axis driver circuit 56 both receive timing signals on lines 58. the X-axis driver circuit 54 receives X-axis data on lines 60, and the Y-axis driver circuit 56 receives Y-axis data on line 62. The driver circuits 54 and 56 and the timing signal and data requirements can be realized from the teaching contained in Murley, Jr. et al, U.S. Pat. No. 4,009,937, issued Mar. 1, 1977, whose teaching is herein incorporated by reference.

The operation of the matrix addressable display 44 is next described. For purposes of illustration, assume the position POS (2,10) that is defined by the intersection of row 2 and column 10 is to be selected or accessed in the display 44 and that the display is to be used in a light transmittive mode, i.e. by accessing a site it is made to become transmittive through alignment of the spherical dipolar particles at the site. To access POS (2,10), an alternating voltage signal at a relatively low frequency f2 is applied across the conductive terminals of the light valve strip defining row 2, and the negative of the alternating voltage signal at relatively low frequency f2 is applied across the conductive terminal of light valve strip defining column 10. All non-accessed matrix positions will have non-complementary signals applied to them, e.g. the row light valve strips that do not have any accessed sites can have the negative of the low frequency signal f2 applied to them, and the column light valve strips that do not have any accessed sites can have either the positive or negative of the high frequency signal f1 applied to them. This combination of signals represents one possible scheme for selectively energizing matrix positions. The spherical dipolar particles within the light valve strips at the intersection of row 2 and column 10, i.e. POS (2, 10) will tend to align to permit maximum transmittance of light energy. All other positions in the matrix 44 will be unaffected by the application of non-complementary signals. By proper selection of high and low frequency voltage signals across specific light valve strips, desired matrix positions can be accessed or selected for display. Similarly, an entire row or column can be accessed as a unit as well as single positions.

Figures 7, 9:
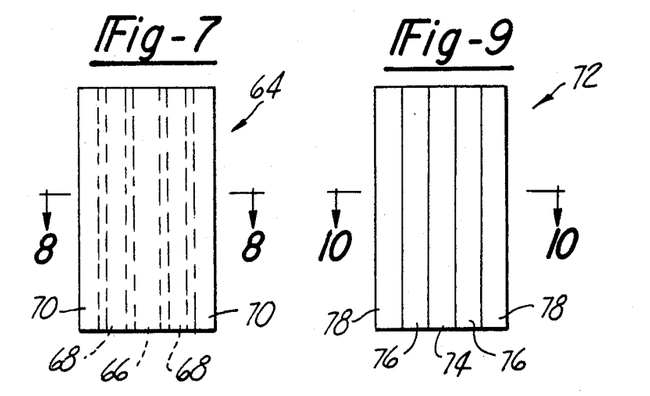
FIG. 7 is an elevational view of the large scale lay-up of components used to manufacture a spherical dipolar particle having a high aspect ratio light absorbing thread for a central section.
FIG. 9 is a large scale lay-up of the components used to manufacture a spherical dipolar bead having a disc-shaped member for a central section.
Figures 8, 10, 11:
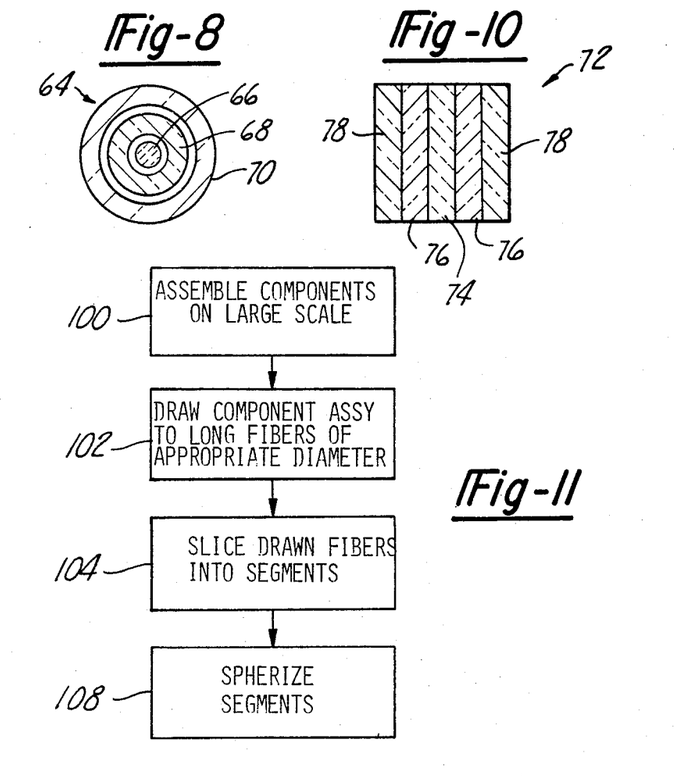
FIG. 8 is a cross-sectional view of FIG. 7 taken along line 8—8 showing the concentric arrangement of the components in the large scale lay-up.
FIG. 10 is a cross-sectional view of FIG. 9 taken along line 10—10 which illustrates the laminated arrangement of the components.
FIG. 11 is a flow chart setting forth the steps involved in the preferred process for manufacturing of spherical dipolar beads of either of the types related to FIGS. 8 and 10.

FIGS. 7–11 are explanatory of the manufacturing process for spherical dipolar particles constructed in accordance with the present invention. FIGS. 7 and 8 are specifically addressed to a spherical dipolar particle having a central section formed of a thread of light-absorbing material. FIGS. 9 and 10 are specifically addressed to the manufacture of this spherical dipolar particle having a central section in the form of a disc that may be either reflective or light-absorptive on its major surfaces. FIG. 11 is a flowchart setting forth the manufacturing steps that are common to the manufacture of spherical dipolar particles of either form of central section.

Referring now to FIG. 11, in step 100 the components that are used to make the spherical dipolar particles are assembled on a large scale basis and secured together. FIGS. 7 and 8 show a large-scale concentric assembly 64 of the components used to manufacture spherical dipolar particles having a central section formed of a light-absorbent thread. The central section is represented by an elongate rod of light-absorbing material 66, preparably extramural absorption glass. The rod 66 is received within a tubular member 68 that represents the intermediate section. The tubular member 68 is formed of a material that has an electrical permittivity that varies through a range of values as the function of the frequency of an electric field applied therethrough. The tubular member 68 is received within another tubular member 70 that represents the outer section. The tubular member 70 is formed of a material that has a relatively stable value of electrical permittivity within the range of values of the material from which the tubular member 68 is formed. The spacing and proportions of the components of the large-scale concentric assembly 64 are selected for ease of illustration, and not necessarily to represent an actual embodiment.

FIGS. 9 and 10 illustrate a large-scale laminated assembly 72 of the components used to manufacture spherical dipolar particles having a central section in the form of a disc. An elongate slab 74 having a rectangular cross-section is formed of material that is either light-absorptive or is made light-reflective on its major surfaces. The central slab 74 is bounded on either side by a pair of elongate slabs 76 having a rectangular cross-section and formed of a material that has an electrical permittivity that is frequency dependent in the manner heretofore described. The pair of elongate slabs 76 represent the intermediate sections. Another pair of elongate slabs having a rectangular cross-section 78 and bound the slabs 74 on either side. The slabs 78 are formed of a material having a relatively stable electrical permittivity that is within the range of values of the material from which the slabs 76 are formed.

Referring again to FIG. 11, in step 102 the component assembly, either 64 or 72, is heated and drawn to a narrowed diameter or thickness by the same techniques that are used to draw out optical fibers.

In step 104, the drawn assembly 64 or 72 is sliced into segments or beads, each segment or bead having a length comparable to the diameter or thickness of the drawn assembly. Each segment represents a dipolar particle in rudimentary, unfinished form.

In step 108, the segments are spherized by any one of a number of known techniques, for example: (a) dropping them through a heated column (lead shot technique); (b) ball milling; or (c) grinding them between closely spaced rotating plates (ball bearing process). Each finished spherical dipolar particle will have a cross-sectional appearance in conformity with the spherical dipolar particle 14 of FIG. 1.

The invention has been described in an illustrative manner, and it is to be understood that the terminology which has been used is intended to be in the nature of words of description rather than of limitation.

Many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A spherical dipolar particle comprising:
a first section diametrically passing through the center of the spherical particle;
a transparent third section defining the outer extremities of the spherical particle in at least two diametrically opposite directions normal to said first section; and
a second section disposed between and joining said first and third sections;
wherein one of said first and second sections has an electrical permittivity variable as a function of the frequency of an oscillating electric field applied thereacross said frequency of oscillation variable in a frequency range between a first frequency and a second frequency, and said electrical permittivity variable from a first value in response to said electrical field oscillating at said first frequency to a second substantially different value in response to said electric field oscillating at said second frequency, and wherein the other of said first and second sections is substantially opaque; and
wherein said third section has an electrical permittivity having a value intermediate said first and second values which is relatively stable in response to electric fields applied thereacross oscillating in said frequency range.

2. The dipolar particle as defined by claim 1 wherein said first section is said other section and said second section is said one section.

3. The dipolar particle as defined in claim 2, wherein the first section is a high aspect ratio thread of light absorbing material.

4. The dipolar particle as defined in claim 3, wherein the thread of light absorbing material is extramural absorption glass.

5. The dipolar particle construction as defined in claim 2, wherein the second section is sodium silicate.

6. The dipolar particle as defined in claim 2 wherein the first section is dichoric polarizing material.

7. The dipolar particle as defined in claim 2, wherein the first section is an opaque disc having two parallel surfaces.

8. The dipolar particle as defined in claim 7, wherein at least one of said parallel surfaces is reflective.

9. The dipolar particle as defined in claim 1, wherein the third section is glass.

10. A light valve comprising:
two parallel electrodes spaced a small distance apart, at least one of said two electrodes being transparent;
a host material having a plurality of particle cavities, said host material filling the space between said two electrodes;
a plurality of spherical dipolar particles having an axis of polarization, one of said spherical particles disposed in each of said particle cavities and free to rotate therein, said spherical particles having a first aligned state possessing a first optical characteristic in response to an oscillating electric field between said two electrodes having a first frequency and rotatable to a second aligned state possessing a second substantially different optical characteristic in response to an oscillating electric field between said two electrodes having a second frequency.

11. The light valve as defined in claim 10 wherein each dipolar particle comprises:
a central section diametrically passing through the center of said spherical particle and containing said axis of polarization;
a transparent outer section defining the outer extremities of the spherical particle in at least two diametrically opposite directions normal to said central section; and
an intermediate section disposed between and fixedly joining said central and outer sections;
wherein one of said central and intermediate sections has an electrical permittivity variable as a function of the frequency of an oscillating electric field generated between said parallel electrodes in a frequency range between a first frequency and a second frequency, said electrical permitivity variable between a first value in response to said electric field oscillating at said first frequency and a second value in response to said electric field oscillating at said second frequency, and said the other of said central and intermediate sections is opaque; and
wherein said outer section has an electrical permittivity which is relatively stable in response to an electric field oscillating in the frequency range between said first and said second frequencies and has a value approximately equal to the permittivity of said host material; and
wherein each cavity further includes a lubricating fluid surrounding the spherical particle disposed therein, said fluid having an electrical permittivity approximately equal to the permittivity of said outer section.

12. The light valve as defined in claim 11, wherein the central section is a high aspect ratio thread of light absorbing material.

13. The light valve as defined in claim 12, wherein the light absorbing material is extramural absorption glass.

14. The light valve as defined in claim 11 wherein said intermediate section is said one section and said central section is said other section.

15. The light valve as defined in claim 14, wherein the intermediate section is sodium silicate.

16. The light valve as defined in claim 14, wherein the central section is an opaque disc having two parallel surfaces.

17. The light valve as defined in claim, 16, wherein at least one of said parallel surfaces is reflective.

18. The light valve as defined in claim 14, wherein the central section is dichoric light polarizing material.

19. The light valve as defined in claim 11, wherein said outer section is glass.

20. The light valve as defined in claim 10, wherein the host material is plasticized to expand said cavities in which the dipolar particles are disposed to provide free rotational motion therewithin.

21. The light valve as defined in claim 10, wherein the host material is an elastomer.

22. The light valve as defined in claim 21, wherein the elastomer is a silicon rubber.

23. The light valve as defined in claim 10, wherein the host material is a sintered plastic.

24. The light valve as defined in claim 10, wherein both of said electrodes are transparent.

25. A matrix addressable display comprising:
two parallel planar members spaced a small distance apart, each of said planar members having an inner surface facing the other planar member and at least one of said planar members being transparent;
a first plurality of transparent electrodes electrically isolated from each other disposed along the inner surface of said at least one transparent planar member in a parallel relationship with respect to each other;
a second plurality of electrodes electrically isolated from each other disposed along the inner surface of the other planar member in a parallel relationship to each other and transverse to said first plurality of transparent electrodes;
a host material having a plurality of spherical particle cavities filling the space between said two planar members;
a plurality of spherical dipolar particles, one of said spherical particles disposed in each of said particle cavities and free to rotate therein, said spherical dipolar particles having a first aligned state possessing a first optical characteristic in response to an oscillating electric field between said first and second plurality of electrodes having a first frequency and rotatable in said particle cavities to a second aligned state possessing a second optical characteristic different from said first optical characteristic in response to an oscillating electric field between said first and second plurality of electrodes having a second frequency.

26. The display as defined in claim 25 wherein each spherical dipolar particle comprises:
a first section diametrically passing through the center of said spherical particle and defining an axis of polarization;
a transparent second section defining the outer extremities of the spherical particle in at least two diametrically opposite directions normal to said first section; and
an intermediate section disposed between and fixedly joining said first and second sections;
wherein one of said first and intermediate sections has an electrical permittivity variable as a function of the frequency of an electric field generated between said first and second plurality of electrodes, said electrical permittivity variable between a first value in response to said electric field oscillating at said first frequency and a second value in response to said electric field oscillating at said second frequency; and
wherein said second section has an electrical permittivity which is relatively stable in response to said electric field oscillating in said frequency range and has a value intermediate said first and second values; and
wherein each cavity further includes a lubricating fluid surrounding the spherical particle disposed therein, said fluid having an electrical permittivity approximately equal to the permittivity of said second section.

27. A method of manufacturing spherical dipolar particles comprising the steps of:
a. stacking together an opaque central member, at least one transparent outer member, and at least one intermediate member to form a first assembly having a first cross section said intermediate member having an electrical permittivity variable as a function of the frequency of an oscillating electric field applied thereacross, said permittivity variable between a first value in response to said electric field oscillating at a first frequency and a second value, different from said first value in response to said electric field oscillating at a second frequency and said outer member having an electrical permittivity which has a value intermediate said first and second values and which is relatively stable in response to said electrical field oscillating in said frequency range;
b. drawing said first assembly in a direction parallel to said central member to produce an elongated assembly having a drawn cross section substantially smaller than said first cross section;
c. slicing said elongated assembly in a direction normal to the length of said elongated assembly to produce a plurality of small segments each having a length approximately equal to the width of said elongated section;
d. processing said plurality of small segments to produce spherically shaped particles.

28. The method of claim 27 wherein said central member is a rod, said intermediate member is a first cylinder having an internal diameter larger than the diameter of said rod and said outer member is a second cylinder having an internal diameter larger than the external diameter of said first cylinder, said step of stacking comprises the steps of inserting said first cylinder into said second cylinder and inserting said rod into said first cylinder to form said first assembly having said intermediate and outer members concentrically disposed about said rod.

29. The method of claim 27 wherein said central member is a rectangular plate, and wherein said intermediate and outer members are a pair of rectangular plates having approximately the same length and width as the rectangular plate comprising said central member, said step of stacking comprises the steps of stacking in a sequential order a first outer member, a first intermediate member, said central member, the other intermediate member and the other outer member to form a laminated first assembly.

* * * * *